Jan. 1, 1952

G. E. BERGGREN 2,581,232

CONTINUOUS VULCANIZING METHOD AND APPARATUS

Filed Sept. 23, 1948

INVENTOR
G. E. BERGGREN
BY *[signature]*
ATTORNEY

Jan. 1, 1952 G. E. BERGGREN 2,581,232
CONTINUOUS VULCANIZING METHOD AND APPARATUS
Filed Sept. 23, 1948 2 SHEETS—SHEET 2

INVENTOR
G. E. BERGGREN
BY *[signature]*
ATTORNEY

Patented Jan. 1, 1952

2,581,232

UNITED STATES PATENT OFFICE 2,581,232

CONTINUOUS VULCANIZING METHOD AND APPARATUS

George E. Berggren, Baltimore, Md., assignor to Western Electric Company, Incorporated, New York, N. Y., a corporation of New York Application September 23, 1948, Serial No. 50,686

29 Claims. (Cl. 18—6)

This invention relates to continuous vulcanizing methods and apparatus, and more particularly to methods of and apparatus for vulcanizing coverings of vulcanizable material upon continuously advancing conductors.

In the manufacture of insulated filamentary articles such as insulated and jacketed conductors and cables, a core having an outer covering of vulcanizable compound therearound is advanced through an elongated vulcanizing tube containing a high pressure, high temperature vulcanizing medium, such as high pressure steam, to vulcanize the covering on the core. Frequently, the core may include a layer of textile material, such as a cotton serving, or a braided or knitted cotton covering. In that case, the vulcanization of the covering often develops high internal pressure in entrapped pockets of air and moisture within the textile layer, which must be reduced substantially to atmospheric pressure before the conductor emerges into the atmosphere in order to prevent blistering of the vulcanized covering on the conductor.

This is generally accomplished by passing the conductor and its vulcanized covering directly into a cooling tube supplied with a low temperature cooling medium, such as cold water, at high pressure for the purpose of cooling the covering until the internal pressures within the covering have been reduced to values such that there is no danger of the cover blistering when it emerges from the cooling medium into the atmosphere. Various devices have been proposed to maintain the escape of the vulcanizing medium from the vulcanizing tube into the cooling tube at a minimum throughout long periods of operation. Excessive leakage of the high temperature vulcanizing medium into the cooling medium raises the temperature of the cooling medium and thereby impairs the efficiency of the cooling medium. Also, it is desirable to minimize loss of the vulcanizing medium as a result of such leakage. To hold this leakage of the vulcanizing medium to a minimum, the pressure of the cooling medium must be maintained substantially equal to the pressure of the vulcanizing medium at all times.

An object of the invention is to provide new and improved continuous vulcanizing methods and apparatus.

A further object of the invention is to provide new and improved vulcanizing methods and apparatus employing a vulcanizing tube and a cooling tube, and new and effective methods and means for regulating the pressure of the water in the cooling tube in accordance with the fluctuations in the pressure of the vulcanizing medium in the vulcanizing tube so as to maintain a balanced pressure condition therebetween at all times.

An apparatus embodying certain features of the invention, and by means of which methods embodying certain features of the invention may be practiced, comprises an elongated tube through which a continuously advancing core having a vulcanizable covering thereon may be passed, means for supplying a high temperature, high pressure fluid to a portion of the tube first encountered by the core to vulcanize the covering, means for supplying a low temperature, high pressure cooling fluid to a portion of the tube subsequently encountered by the core to cool the vulcanized covering, and means independently responsive to the temperatures of the cooling medium and the vulcanizing medium for regulating their respective pressures in the elongated tube so as to maintain the pressure of the cooling fluid substantially equal to the pressure of the vulcanizing fluid.

If it is desired, means may be provided for draining the mixed fluids forming at the junction point of the fluids within the tube from the tube, and the rate of discharge of the mixed fluids may be regulated by means responsive to the temperature of the mixed fluids. The temperature responsive means controlling the rate of discharge of the mixed fluids from the tube is adapted to operate in conjunction with the temperature responsive means controlling the pressures of the vulcanizing fluid and the cooling fluid so as to maintain the pressures of the fluids substantially in equilibrium.

A complete understanding of the invention may be obtained from the following detailed description of an apparatus forming a specific embodiment thereof, when read in conjunction with the appended drawings, in which.

Figure 1:
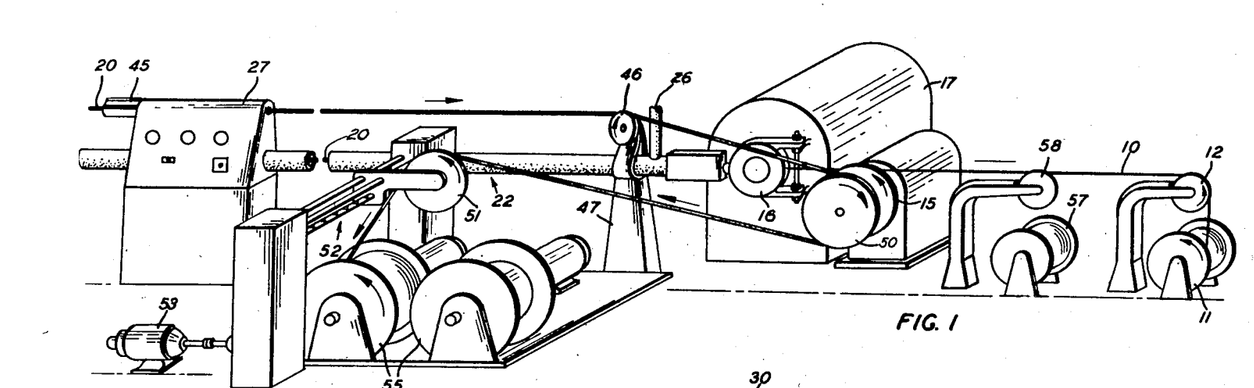
Fig. 1 is a perspective view of a portion of an apparatus used for continuously extruding and vulcanizing insulated covering on a filamentary conductor in accordance with one embodiment of the invention.

Referring now in detail to the drawings and more particularly to Fig. 1, there is shown a filamentary conductor 10 being withdrawn from a rotatably mounted supply reel 11 and around a guide pulley 12 by a motor driven capstan 15 which is turning at a constant rate of speed in a counter-clockwise direction. The conductor 10 passes around the capstan 15 and then through an extruding head 16, forming part of an extruder 17, which extrudes a vulcanizable covering around the conductor 10 to form a covered conductor indicated by the numeral 20.

Figure 2:
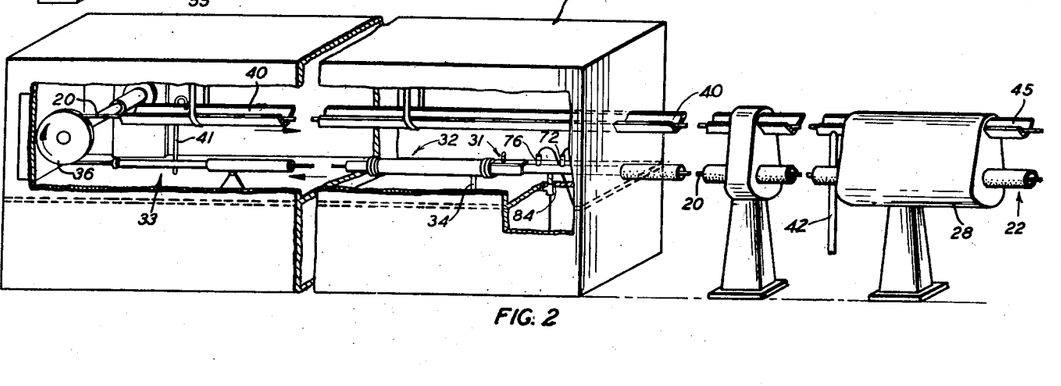
Fig. 2 is a perspective view showing a continuation of the apparatus shown in Fig. 1 from the left-hand end thereof.

Upon leaving the extruding head 16, the covered conductor 20 passes into an elongated vulcanizing tube indicated generally at 22, which consists of a steam tube 23, a tubular jacket 24 surrounding the tube 23 (Fig. 2), and an insulating jacket 25 surrounding the jacket 24. High pressure, high temperature steam is admitted from a suitable supply source (not shown) to the steam tube 23 by a pipe 26 whereby the entire tube 23 is filled with high pressure steam, and steam is admitted to the jacket 24 surrounding the tube 23 for the purpose of maintaining the steam in the tube 23 at a high temperature.

The vulcanizing tube 22 (Fig. 1) is connected to the extruding head 16 and continues therefrom through a housing enclosing a high voltage sparktester 27 (Fig. 2), and through a housing enclosing an air wiper 28 to an elongated enclosure 30. The covered conductor passes through the elongated vulcanizing tube 22 and upon emerging therefrom passes directly through a splice box indicated generally at 31, an elongated cooling tube indicated generally at 32 and a water pressure reducing nozzle 33 into the atmosphere. Low temperature water under pressure is admitted to the cooling tube 32 by means of a pipe 34 threadly engaging the tube adjacent to the entrance end thereof for the purpose of cooling the previously vulcanized covering of the covered conductor 20. The conductor 20, upon leaving the nozzle 33, passes around the idler sheave 36 and travels along a V-shaped trough 40 to which a continuous stream of cold water is supplied by the pipe 41. A pipe 42 is connected to the trough 40 adjacent to the air wiper 28 to drain the water from the trough.

The conductor 20 passes from the trough 40 through the air wiper 28, which removes the moisture from the covering and then along a V-shaped trough 45 and through the sparktester 27 (Fig. 1) where the covering is subjected to a high voltage to detect any faults in the covering. The conductor 20 then passes around an idler pulley 46 which guides the conductor 20 to a capstan 50 (Fig. 1) which is turning at a constant speed in a clockwise direction. The conductor 20 passes around the capstan 50 and then over a pulley 51 mounted on a traversing apparatus indicated generally at 52 which is driven by a motor 53. The traverse apparatus 52, including the pulley 51, distributes the conductor 20 evenly on one of motor driven takeup reels 55—55.

The dual takeup reels 55—55 are provided for the purpose of permitting continuous reeling of the covered conductor 20. A second supply reel 57, containing a conductor identical with the conductor 10, and a second guide pulley 58 are provided for the purpose of maintaining a supply of the filamentary conductor at the extruder 17 which will permit a substantially continuous extruding and vulcanization process.

The covering on the conductor 20, in passing through the steam tube 23 of the vulcanizing tube 22 is subjected to heat and pressure sufficient to vulcanize the covering. During the vulcanization of the covering however, undesirable high internal pressures are developed in entrapped pockets of air and moisture within the covering, or between the covering and the conductor. In order to prevent these high internal pressures from blistering the covering when the conductor emerges into the atmosphere, the conductor 20, upon leaving the steam tube, passes through the cooling tube 32 filled with low temperature water under pressure which serves to reduce the internal pressures within the coverings to values such that there is no danger of the covering bursting at these points when the covered conductor emerges into the atmosphere.

While, the pressure of the water in the cooling tube 32 must be maintained at a pressure equal at least to the entrapped internal pressures within the covering to prevent the covering from bursting as the conductor passes therethrough, it is also expedient that it be maintained substantially equal to the pressure of the steam in the vulcanizing tube at all times in order to prevent excessive escape of the steam from the mixing chamber and splice box into the cooling tube. Such leakage of the steam results in raising of the temperature of the cooling water above its most effective operating temperature. The steam admitted to the steam tube 23 is subject to substantial fluctuation in pressure over sustained periods of operation and, therefore, it is necessary to continuously maintain the pressure of the water in the cooling tube substantially equal to the pressure of the steam in the vulcanizing tube to maintain a minimum leakage of steam into the cooling tube at all times.

Figures 3, 4:
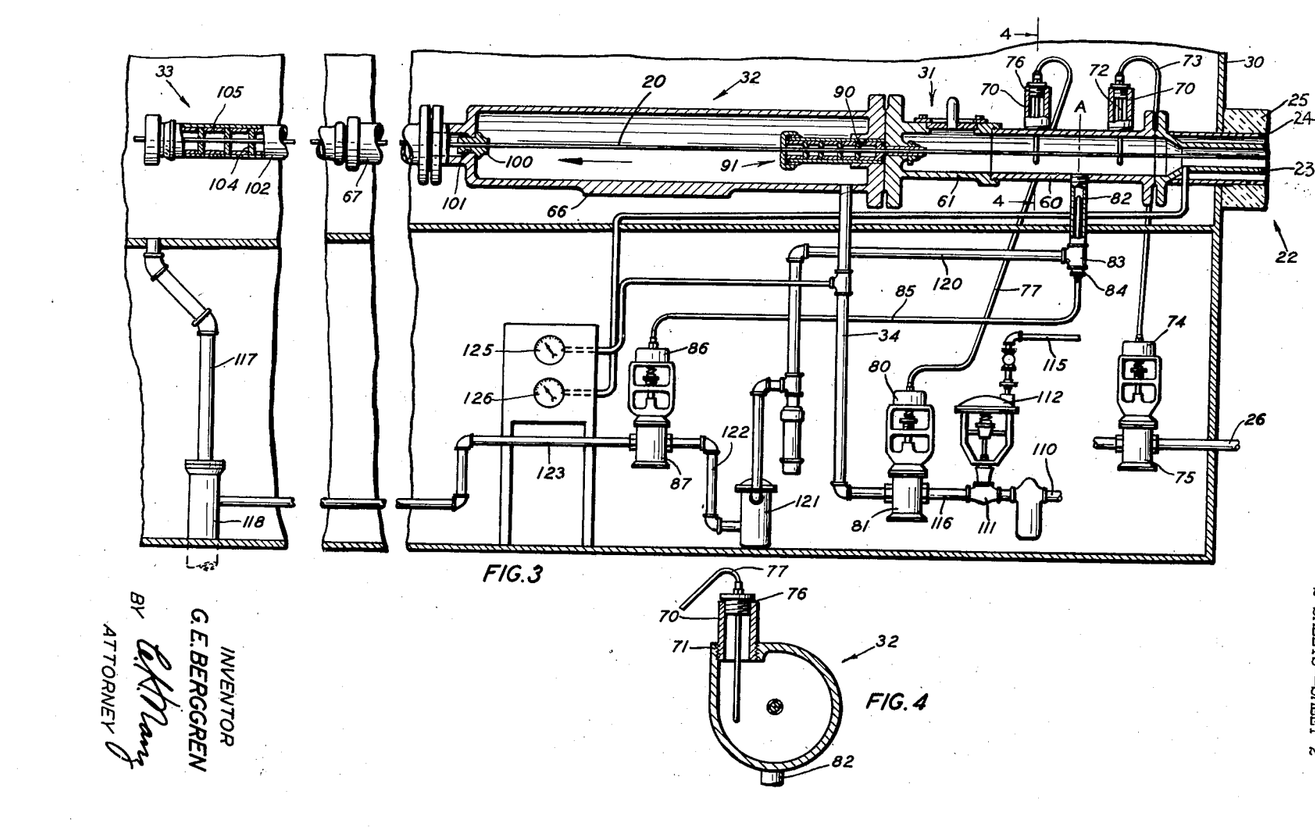
Fig. 3 is an enlarged, fragmentary side elevation of a portion of the apparatus shown in Fig. 2.
Fig. 4 is an enlarged vertical sectional view taken along line 4—4 of Fig. 3.

Referring now to Fig. 3 of the drawings, it will be noted that the splice box 31 includes a short tubular member 60 having one end thereof threadedly mounted into a rectangular body 61 of the splice box and having the opposite end thereof suitably connected so as to communicate with the adjacent end of the steam tube 23. The rectangular body portion 61 is connected so as to communicate with the cooling tube 32 comprising a tubular body 66, which is connected to communicate with the body 61 of the splice box 31 and an elongated tubular member 67 which is connected to communicate with the nozzle 33.

The tubular member 60 shall be referred to hereinafter as the mixing tube 60 because it is within the tubular member 60 that the junction point of the cooling water and steam is maintained at all times by pressure control devices hereinafter to be described.

The mixing tube 60 has a pipe nipple 70 (Figs. 3 and 4) threadedly mounted in a boss 71 provided adjacent to each end of the mixing tube 60. A thermostatic bulb 72 (Figs. 3 and 4) is mounted in the nipple positioned adjacent to the right end of the steam tube 23 so that a substantial portion of the bulb will be immersed in the steam entering the right end of the mixing tube 60. The thermostatic bulb 72 is provided with a capillary tube 73 which connects the thermostatic bulb 72 to a vapor pressure device 74 adapted to regulate the movement of a pressure control valve 75 mounted in the steam line 26 and thereby regulates the admission of steam from the supply source to the line 26, which conducts the steam into the steam tube 23. A thermostatic bulb 76 is threadedly mounted in the nipple 70 positioned adjacent to the body portion 61 of the splice box 31 so as to be immersed in the water entering the left end of the mixing tube 60. The thermostatic bulb 76 is provided with a capillary tube 77, which connects the bulb 76 to a vapor pressure device 80 adapted to regulate the movement of a pressure control valve 81, the outlet port of which is connected to the pipe 34 through which the cooling water is admitted to the cooling tube 32.

A pipe nipple 82 is threadedly mounted in the under side of the mixing tube 60 (Figs. 3 and 4) so as to be centrally positioned between the thermostatic bulbs 72 and 76. A T 83 is secured on the free end of the nipple 82 and a thermostatic bulb 84 is threadedly mounted in the opposite opening of the T 83 so that the sensitive portion thereof extends well into the pipe nipple 82. A capillary tube 85 connects the thermostatic bulb 84D a vapor pressure device 86 adapted to regulate the movement of a valve 87. The thermostatic bulbs 72, 76 and 84 are hermetically sealed and together with their respective capillary tubes provide a sensitive pressure system containing a sensitive fluid, the pressure of which is readily affected by slight changes of temperature. Pressure changes in the bulbs due to increases or decreases in the temperature of the steam, water or condensate in which they are immersed, are transmitted through their respective capillary tubes to the vapor pressure device associated with their respective control valves. Changes in pressure in a respective vapor pressure device effect a corresponding variation in the opening of its associated valve. Each of the thermostatic bulbs 72, 76 and 84 is adapted to operate within a given temperature range in accordance with the normal operating temperature of the steam, water or condensate in which they are immersed.

The right end of the body 66 of the cooling tube 32 is provided with a central bore 90 in which a baffled tube 91 is positioned so that a substantial portion thereof extends into the cooling tube 32. The conductor 20 passes through the baffled tube 91 in traveling from the splice box 31 into the cooling tube 32. The baffled tube 91 is provided in the right end of the cooling tube to prevent sudden increases in the pressure of the steam in the steam tube 23 from causing the steam to surge from the splice box 31 into the cooling tube and to thereby force substantial quantities of water therefrom through the nozzle 33, and also to prevent water in the cooling tube from surging into the splice box and steam tube upon substantial decreases in the pressure of the steam in the vulcanizing tube.

The construction and operation of the baffled tube 91 is described specifically and claimed in my co-pending application Serial No. 17,916, filed March 30, 1948. Hence, a more detailed description of the tube will not be given herein.

A gland 100 is threadedly mounted in a central bore 101 provided in the left end of the body 66 (Fig. 3) to substantially close the exit end of the body 66 except for a central aperture in the gland through which the conductor 20 passes as it travels from the tubular body 66 into the tubular member 67 of the cooling tube. The nozzle 33 consists of a tubular member 102 removably secured to the left end of the tubular member 67 of the cooling tube 32. The tubular member 102 is provided with a plurality of annular baffles 104—104 positioned therein between tubular spacers 105—105. The annular baffles 104—104 are provided with a central aperture through which the conductor passes as it travels through the nozzle 33 and emerges into the atmosphere. The provision of the baffles 104—104 (Fig. 3) in the nozzle 33, permits the water in the cooling tube 32 to escape therefrom at a substantially low rate of flow into the closure 30 and at the same time gradually reduces the pressure of the escaping water to that of the atmosphere. The nozzle 33 permits a continuous circulation of the cooling water from the pipe 34 through the entire length of the cooling tube, whereby water in the cooling tube may be maintained at its most effective operating temperature.

Low temperature water under a pressure substantially higher than the maximum pressure which may be reached by the steam in the vulcanizing tube is conducted from a suitable supply source (not shown) by a pipe 110 to a reducing valve 111 arranged to be actuated by an air diaphragm 112. The air diaphragm 112 receives air under constant pressure from a supply line 115. The cooling water, upon leaving the reducing valve 111, passes through a pipe 116 to the valve 81 which is regulated by the thermostatic bulb 76 and its associated capillary tube 77 and vapor pressure device 80. The constant air pressure received from the air supply line 115, actuates the diaphragm apparatus 112 and effects an opening of the valve 111 which will maintain the water in the line 116 connected thereto at a constant pressure, but at a pressure slightly lower than the pressure of the water in the line 110. The water passes through the valve 81 and through the pipe 34 to the tubular body 66 of the cooling tube 32 and circulates through the tubular body 66 and the tubular member 67, and then passes through the nozzle 33 into the closure 30. A pipe 117 drains the water from the closure 30 to a large drain pipe 118 which drain may return the water to a suitable water cooling system, after which it may be recirculated to the water supply pipe 110 and again circulated through the cooling tube 32.

When steam is admitted to the vulcanizing tube 22 and water is admitted to the cooling tube 32, it is desirable that the junction point of the steam from the vulcanizing tube 22 and the water from the cooling tube 32 occur in the mixing tube 60 normally midway between the thermostatic bulbs 72 and 76, which position is indicated by the broken line A (Fig. 3). When the junction point assumes the A position in the mixing tube 60, the bulb 76 is surrounded by relatively hot water, the bulb 72 is surrounded by low temperature steam and the bulb 84 is surrounded by the condensate forming at the junction point. This position of the junction point causes a definite temperature to exist at each of the thermostatic bulbs 72, 76 and 84 which bears a definite relation to the pressure and temperature of the steam in the vulcanizing tube. To maintain the junction point at the A position in the mixing tube for long periods of operation, it is necessary to maintain the pressures of the steam and water substantially in equilibrium.

This balanced pressure condition is obtained by virtue of the fact that the bulb 72 is arranged to decrease the opening of its associated steam pressure control valve 75 upon any increase in the operating temperature of the steam surrounding the bulb 72, that the bulb 76 is arranged to increase the opening of the water pressure control valve 81 upon any increase in the operating temperature of the water surrounding the bulb 76, and that the bulb 84 is arranged to reduce the opening of the valve 87 upon any increase in the temperature of the condensate forming at the junction point A. The reverse operation of each control valve will take place upon the occurrence of the opposite condition at its respective thermostatic bulb. Sudden increases in the pressure of the steam in the vulcanizing tube causes the junction point to move its mid-position in the tube 60 to the left toward the thermostatic bulb 76, whereas sudden decreases in the pressure of the steam will cause the junction point to move to the right toward the thermostatic bulb 72. Such movement of the junction point results in a corresponding change in the temperature existing at each of the thermostatic bulbs 72, 76 and 84 and a corresponding change in the opening of the valves controlled thereby so as to restore equilibrium between the water and steam pressures.

The water and steam condensate forming at the junction point A fills the pipe and nipple 82 and surrounds the thermostatic bulb 84. The condensate forming at the junction point A and contained in the nipple 82 is drained through a pipe 120 to a steam well 121, and from the well 121 through a pipe 122 to the valve 87 controlled by the vapor pressure device 86 and its associated thermostatic bulb 84. The valve 87 regulates the flow of the condensate from the mixing tube 60 through a pipe line 123 to the drain 118. The well 121 and the valve 87 permit the condensate forming at the junction point of the water and steam to be discharged from the mixing tube 60 at a rate commensurate with the pressure of the steam in the vulcanizing tube and at the same time reduces the pressure of the condensate to values at which it may be discharged safely into the drain 118.

A gauge 125 is suitably mounted beneath the lower portion of the enclosure 30 for indicating the pressure of the water in the supply line 34 and the cooling tube 32. A pressure gauge 126 is also mounted in the lower portion of the enclosure 30 for indicating the pressure of the steam in the steam tube 23 of the vulcanizing tube 22.

*Operation*

Let it be assumed that the conductor 10 has been threaded through the vulcanizing tube 22, the cooling tube 32, the splice box 31, and the nozzle 33 to one of the takeup reels 55—55. High pressure, high temperature steam is first admitted to the vulcanizing tube 22 through the valve 75 and the pipe 26 and fills the tube 23 and splice box 31. Some steam leaks through the baffled tube 91 into the cooling tube 31 until water is admitted to the cooling tube. Upon the initial admission of steam into the steam tube 22, the high temperature of the steam in the mixing tube, which surrounds the thermostatic bulb 72, effects a change in the pressure of the liquid in the thermostatic bulb 72 and the capillary tube 73 and reduces the opening of the valve 75 since the valve 75 is arranged to have a greater opening when the thermostatic bulb 72 is surrounded by low temperature steam occurring adjacent to the junction point A.

The steam in the mixing tube 60 also surrounds the thermostatic bulb 76 and, due to the high temperature of the steam, the pressure of the liquid within the bulb and its capillary tube 77 is such that it effects a maximum opening of the valve 81. Low temperature, high pressure water flows from the pipe 110 through the reducing valve 111 and through the open valve 81 into the cooling tube 32 and completely fills the cooling tube 32 and the nozzle 33. Since the thermostatic bulb 76 is maintaining a maximum opening of the valve 81, the water in the cooling tube 32 initially reaches a pressure slightly higher than the pressure of the steam in the vulcanizing tube and mixing tube with the result that the water flows through the baffled tube 91 into the splice box 31 and thereby prevents further leakage of the steam into the cooling tube. The water emerging from the tube 91 engages the steam at the right end thereof, and due to the unbalanced condition between the pressure of the water and the steam, forces the junction point to the right toward the normal junction point position at the broken line A midway beween the thermostatic bulbs 72 and 76.

While this movement of the junction point is taking place in the mixing tube, the steam admitted to the vulcanizing tube 22 also surrounds the thermostatic bulb 84 positioned in the nipple 82 mounted on the mixing tube 60 so as to be positioned midway between the bulbs 72 and 76. Since the thermostatic bulb 84 is arranged to operate within the temperature range of the condensate forming at the junction point, the high temperature steam effects a pressure within the bulb and its capillary tube which produces a minimum opening of the valve 87. This minimum opening maintained in the valve 87 temporarily permits a minimum escape of the steam from the mixing tube to the drain 118.

As the water pressure continues to move the junction point toward its normal operating position A midway between the bulbs 72 and 76, the temperature at each of the thermostatic bulbs 72, 76 and 84 is continually decreasing, which in turn creates a corresponding reduction in the pressure of the liquid within the bulbs and their respective capillary tubes and thereby effects a corresponding increase in the opening of the valve 75, a decrease in the opening of the valve 81 and an increase in the opening of the valve 87.

Eventually the junction point of the water and the steam will assume the A position in the mixing tube 60 and the thermostatic bulbs 72, 76 and 84 will maintain an opening of their respective valves so as to maintain the pressure of the water within the cooling tube 32 substantially equal to the pressure of the steam in the vulcanizing tube. As long as the pressure of the steam in the vulcanizing tube remains substantially constant, the thermostatic bulbs will continually maintain the rate of admission of the water to the cooling tube and the rate of discharge of the condensate from the mixing tube at values which will maintain the junction point of the steam and water midway between the bulbs 72 and 76. Under these operating conditions the steam and water condensate forming at the junction point is discharged therefrom through the valve 87 at a rate commensurate with the rate at which it is forming, whereby only a minimum transfer of heat occurs from the junction point through the baffled tube 91 into the cooling tube 32. As a result, the water in the cooling tube is maintained at its most effective cooling temperature and pressure, and the vulcanized covering of the conductor 20 passing through the cooling tube is sufficiently cooled under pressure so that the internal pressures within the covering are reduced to values such that no blistering of the covering will occur as the conductor 20 passes through the cooling water or as it emerges from the nozzle 33 into the atmosphere.

Let it be assumed that a sudden increase occurs in the pressure of the steam in the vulcanizing tube 22. This increase in the pressure of the steam moves the junction point of the water and the steam slowly toward the thermostatic bulb 76 positioned adjacent to the left end of the mixing tube 60. This movement of the junction point in turn increases the rate of leakage of hot water from the junction point through the baffled tube 91 into the cooling tube 32. This increased leakage of hot water through the tube 91 raises the temeperature of the water in the cooling tube. If this condition were allowed to prevail for a long period of time, the temperature of the water would reach a point at which the vulcanized covering would not be cooled sufficiently to reduce the high internal pressures entrapped therein to safe values as the conductor passes through the cooling tube. As a result, when the covered conductor emerges into the atmosphere, blistering of the covering is likely to occur. The movement of the junction point toward the bulb 76 places the bulbs 72 and 76 no longer astride the junction point, in which case, the bulb 76 is surrounded by higher temperature water adjacent the junction point, while the bulb 72 is surrounded by steam of substantially higher temperature. The temperature of the steam at the junction point also increases with the increase in the steam pressure, and as a result tends to increase the temperature of the water adjacent to the junction point and surrounding the bulb 76.

The increase in temperature at the thermostatic bulb 72 results in an increased pressure in the capillary tube 73 and its vapor pressure device 74 and effects a corresponding decrease in the opening of the valve 75, which in turn reduces the pressure of the steam in the vulcanizing tube 22 to a value slightly below that of the steam in the steam supply source. Simultaneously, with this operation of the valve 75, the increased temperature at the bulb 76 produces a corresponding increased opening in the valve 81, whereby the pressure of the water admitted thereby to the cooling tube is increased. At the same time the movement of the junction point is effecting this corresponding regulation of the valves 75 and 81, the thermostatic bulb 84 is also subjected to higher temperature condensate, which increases the pressure in the capillary tube 85 and its vapor pressure device 74, and produces a corresponding decrease in the opening of the valve 87. The decreased opening of the valve 87 is necessary to prevent an excessive escape of high temperature, high pressure steam from the vulcanizing tube when such increases in the pressure of the steam occur.

While the movement of the junction point has effected a decrease in the pressure of the steam in the vulcanizing tube and an increase in the pressure of the water in the cooling tube, the pressure of the water slightly exceeds that of the steam due to the off center position of the junction point with respect to the bulbs 72 and 76, and the increased temperature of the steam, whereby further movement of the junction point toward the left end of the mixing tube 60 is prevented. This unbalanced pressure condition between the water and the steam now causes the junction point to begin to move to the right toward its normal mid-position A between the bulbs 72 and 76. The movement of the junction point in this direction results in a continuous decrease in temperature of the steam, water and condensate surrounding the bulbs 72, 76 and 84, respectively, which effects a continuous adjustment of the opening of their respective valves 75, 81 and 87, which in turn effects a continuous increase in the pressure of the steam in the vulcanizing tube, a continuous decrease in the pressure of the water in the cooling tube, and a continuous increase in the rate of discharge of the condensate from the junction point into the drain 118.

When the junction point reaches the mid-position in the mixing tube, the temperature existing at each of the bulbs, in each case, effects corresponding opening of its associated valve so that the pressure of the water in the cooling tube substantially equals the pressure of the steam in the vulcanizing tube, and the rate of discharge of the condensate from the junction point is such that a minimum leakage of condensate occurs through the tube 91 into the cooling tube 32 with the passage of the conductor through the tube 91. Since the temperature of the steam has increased with the increased pressure, the temperature of the water surrounding the bulb 76 is slightly higher than the temperature of the water before the change in the steam pressure occured, in which case, the increased temperature of the steam maintains an increased opening of the valve 81 so as to keep the pressure of the water in the cooling tube 32 substantially equal to the pressure of the steam. By maintaining the pressure of the water substantially equal to the increased steam pressure in this manner, the temperature of the water in the cooling tube remains at its most effective operating temperature and the vulcanized covering of the conductor is sufficiently cooled in passing therethrough whereby blistering of the covering as the conductor emerges into the atmosphere is prevented.

When a sudden decrease in the pressure of the steam at the supply source occurs, it results in the apparatus operating with the pressure of the water in the cooling tube 32 exceeding the pressure of the steam in the vulcanizing tube 22. Under these conditions the cooling water forces its way through the baffled tube 91 and enters the splice box 31 and the mixing tube 60, whereupon the junction point of the water and steam starts moving slowly toward the thermostatic bulb 72 positioned adjacent to the right end of the mixing tube 60. Since the water pressure now exceeds the steam pressure, there is substantially less leakage of hot water from the junction point into the cooling tube whereby the heating effect on the water in the cooling tube normally caused by such leakage is reduced. The reduction of the heating effect on the water in the cooling tube allows the entire body of water to reach a lower temperature as the water circulates through the cooling tube. While the cooling effect of the water is not impaired by the reduction of pressure of the steam, if this condition were allowed to prevail for a long period, the water would eventually penetrate a substantial distance into the vulcanizing tube and prevent proper vulcanization of the covering of the conductor 20.

As the junction point moves toward the right end of the mixing tube 60, the bulbs 72, 76 and 84 are surrounded with lower temperature steam, water and condensate forming at the junction point. The decrease in temperature of the steam at the bulb 72 effects a decrease in pressure in the vapor pressure device 74, which increases the opening of the valve 75 and permits an increased steam pressure in the vulcanizing tube. At the same time, the decrease in the temperature of the water at the bulb 76 effects a decreased pressure in the vapor pressure device 80, which effects a decreased opening of the valve 81, whereby the pressure of the water admitted to the cooling tube is reduced. At the same time, the reduced temperature at the bulb 84 effects an increased opening in the valve 87, which permits an increased rate of discharge of the condensate from the mixing tube 60 to the drain 118.

By simultaneously increasing the pressure of the steam and decreasing the pressure of the water, further movement of the junction point toward the right end of the mixing tube 60 is prevented. Due to the off center position of the junction point and the fact that the temperature of the steam decreases with the decreased steam pressure, the resulting change in temperature at the bulbs 72 and 76 is not uniform, in which case, the regulation of the valve 75 is such that the pressure of the steam slightly exceeds the pressure of the water in the cooling tube. This unbalanced condition between the water and the steam pressures starts the junction point moving slowly toward its normal A position in the mixing tube. As the junction point moves back toward its normal position, the temperatures of the steam, water and condensate surrounding the bulbs 72, 76 and 84, respectively, gradually increase, and this increased temperature, in each case, effects a corresponding opening of the respective valves so as to bring the pressure of the water and the steam substantially in equilibrium.

When the junction point finally reaches midposition between the bulbs 72 and 76, the temperature of the steam and water adjacent to the junction point is such that the valves 75 and 81 are regulated thereby to maintain the pressure of the water substantially equal to that of the steam. Since the temperature of the steam dropped with the drop in steam pressure, the temperature of the water surrounding the bulb 76 is substantially lower than it was prior to the decrease in the steam pressure, and this reduction in the temperature at the bulb 76 maintains a decreased opening of the valve 81, which in turn maintains the necessary reduction in the pressure of the water in the cooling tube. Upon the return of the junction point to its normal position in the mixing tube 60, the temperature at the bulb 84 increases as the water is driven back and effects a corresponding decreased opening of the valve 87, which in turn regulates the rate of discharge of the condensate from the mixing tube at a rate commensurate with the pressure and temperature of the steam in the vulcanizing tube.

After the junction point is restored to its normal operating position, the apparatus continues to operate in a substantially stable manner as long as the pressure of the water is substantially equal to the pressure of the steam of the vulcanizing tube. Any subsequent decrease or increase in the pressure of the steam in the vulcanizing tube will effect a corresponding regulation of the water and the steam in the manner described above to maintain a state of equilibrium between the water and the steam at all times. Since the bulbs 72, 76 and 84 always maintain equal water and steam pressure, regardless of any fluctuations which may occur in the steam pressure, the proper cooling of the vulcanized covering of the conductor as it passes through the cooling tube is assured and danger of the covering blistering upon emerging into the atmosphere is eliminated.

To maintain such a control of the water pressure with respect to the steam pressure, the opening of the valves 75, 81 and 87 are adjusted so that, for a given steam pressure and corresponding temperature at the bulbs 72, 76 and 84, the pressure of the water in the cooling tube is maintained slightly under the pressure of the steam in the vulcanizing tube so that there is always present a normal, but small, leakage of hot water into the cooling tube. It is preferable to have the leakage occur from the mixing tube to the cooling tube, rather than the reverse condition, because the amount of steam condensed under this condition is at a minimum, and, hence, the steam consumption of the apparatus is accurately regulated so as to maintain a high degree of efficiency in the operation of the apparatus.

In operating continuous vulcanizing apparatus like that described hereinabove, it has been found that a steam pressure of at least 150 pounds per square inch in the vulcanizing tube will vulcanize satisfactorily the covering on the conductor advancing therethrough. Under certain operating conditions established by the size of the conductor and the rate at which it travels through the vulcanizing tube, it has been found that a vulcanizing tube approximately 200 feet long having steam therein under a pressure of 250 pounds per square inch will prove satisfactory. With such a steam pressure, the water in the supply line 110 is maintained at a pressure of 270 pounds per square inch to allow for fluctuations in the steam pressure. The valve 81, in response to the thermostatic bulb 76 and its vapor pressure device 80, reduces the pressure of the water admitted to the cooling tube so that it is substantially equal to the pressure of the steam at all times. Under these conditions, it has been found that, when the cooling tube 32 is approximately sixteen feet long and the nozzle 34 is approximately three feet long, the apparatus will cool the covering and reduce the internal pressures therein so that danger of the covering blistering after it has passed through the cooling tube is prevented. When the steam is approximately at 250 pounds pressure in the vulcanizing tube 22, the temperature of the steam surrounding the bulb 72 is approximately 400° F. The temperature of the water admitted to the cooling tube 32 is approximately 38° F., in which case, the temperature of the water surrounding the bulb 76 is approximately 100° F. and the temperature of the condensate is about 140° F. under normal conditions. Under these conditions, the bulbs 72, 76 and 84, in response to these temperatures, set the valves 75, 81 and 87 so as to maintain the pressure of the water substantially equal to the pressure of the steam. A change in the steam pressure effects a corresponding change in the temperature of the steam, water and condensate surrounding the bulbs due to the resulting movement of the junction point. The bulbs and their respective vapor pressure devices, in response to any change in the temperature of the steam, water and condensate, regulate their respective valves 75, 81 and 87 accordingly, whereby equilibrium is restored between the water and steam pressures.

The above-described apparatus is particularly well adapted to control the pressure of the steam in the vulcanizing tube, the pressure of the water in the cooling tube and the rate of discharge of the condensate from the mixing tube so as to maintain the pressures in equilibrium in situations where the pressure of the steam at the supply source is subject to substantial fluctuation during the operation of the apparatus. It is to be understood that where the steam pressure at the supply source is subject only to slight variations, a satisfactory control of the vulcanizing apparatus may be had by using only the thermostatic bulb 72 immersed in the steam adjacent to the junction point of the water and the steam, together with its associated vapor pressure device 74 and pressure control valve 75. The valve 81 and its vapor pressure device may be replaced with a pressure reducing valve, which would maintain a predetermined water pressure in the cooling tube 32. The valve 87 and its vapor-pressure device may be replaced with a conventional steam trap set to discharge the condensate from the mixing tube at a predetermined rate. Under these conditions the only variable control provided in the apparatus would be the valve 75 to regulate the pressure of the steam in the vulcanizing tube 22 in accordance with its temperature at a point adjacent to the junction point of the water and steam.

Since, in such a system, the pressure of the water in the cooling tube 32 is maintained substantially at a predetermined pressure, the opening of the valve 75 is adjusted to obtain a steam pressure equal to the water pressure, whereupon the junction point of the steam and water occurs along the line A in the mixing tube. If for any reason the pressure of the steam in the vulcanizing tube 22 should decrease or increase slightly, a corresponding change in the temperature of the steam surrounding the temperature bulb positioned adjacent to the junction point A occurs. This change in the temperature of the steam causes the thermostatic bulb 72 to increase or decrease the opening of the valve 75 and return the pressure of the steam in the vulcanizing tube to the required value.

This method of maintaining a balance between the pressure of the water and the pressure of the steam in continuous vulcanizing apparatus is satisfactory where the pressure of the steam at the supply source is not likely to drop below the fixed water pressure in the cooling tube. Let it be assumed that the normal pressure of the steam at the supply source is 300 lbs., and that the pressure fluctuates plus or minus 5 lbs. Under these conditions the pressure of the water in the cooling tube may be fixed at a predetermined value, say 250 lbs. per square inch. Any fluctuation in the pressure of the steam at the supply source effects a corresponding fluctuation in the pressure and temperature of the steam in the vulcanizing tube. The valve 75 is throttled in accordance with the fluctuations in the temperature of the steam in the vulcanizing tube so as to maintain the pressures of the water and steam substantially equal. Where conditions are such that the pressure of the steam is liable to drop below the fixed water pressure, it is necessary to employ a variable pressure control for the water in order to continuously maintain the pressure of the water equal to the pressure of the steam.

The vulcanizing tube 22, the mixing tube 60, the splice box 31, the cooling tube 32 and the nozzle 33 have been described as separate elements for the purpose of simplifying the specification and for emphasing the particular function each element performs in the treatment of the insulated conductor 20. The vulcanizing tube 22 comprises a plurality of lengths of pipe secured together in tandem to form a continuous tube having a predetermined length. The mixing tube 60 is a length of pipe designed to receive the resistance bulbs 72 and 76 which straddle the normal junction point of the steam and water. The splice box 31 is interposed between the exit end of the mixing tube and the entrance end of the cooling tube to provide a closure which may be opened when the conductor 10 is threaded from the extruding head 16 through the vulcanizing tube and cooling tube. Since this assembly of these elements provides a continuous chamber in which the conductor is enclosed from the time it leaves the extruding head 16 until it emerges from the nozzle 34, the entire assembly may be considered as a single tube having a steam-filled portion of sufficient length to vulcanize the covering on the core 10 and a water-filled portion of sufficient length to cool the covering before it emerges into the atmosphere.

What is claimed is:

1. An apparatus for vulcanizing a vulcanizable covering surrounding a continuously advancing filamentary core, which comprises an elongated tube through which the core passes continuously, means for supplying a high temperature, high pressure fluid to a portion of the tube first encountered by the advancing core to vulcanize the covering thereon, means for supplying a low temperature fluid under pressure to a portion of the tube subsequently encountered by the core to cool the vulcanized covering before the advancing core emerges from the tube into the atmosphere, means for independently regulating the pressure of each fluid within its respective portion of the tube, and temperature-sensitive means for controlling each pressure regulating means in accordance with the temperature of their respective fluids at predetermined points in the tube so as to maintain the pressures of the fluids within the tube substantially in equilibrium.

2. An apparatus for vulcanizing a vulcanizable covering surrounding a continuously advancing filamentary core, which comprises means for subjecting the covering on the advancing core to a high temperature, high but fluctuating pressure vulcanizing vapor to vulcanize said covering, means for subjecting the vulcanized covering to a low temperature cooling liquid under pressure as it emerges from said vulcanizing vapor to cool the vulcanized covering on the core, means for independently regulating the pressure of each of the vapor and the liquid, and means independently responsive to the temperatures of the vulcanizing vapor and the cooling liquid at fixed points therein for controlling their respective regulating means so as to maintain their pressures substantially equal.

3. An apparatus for vulcanizing a vulcanizable covering surrounding a continuously advancing filamentary core, which comprises an elongated tube through which such a covered core may pass continuously, for means for supplying a high temperature, high pressure vulcanizing fluid to a portion of the tube first encountered by the advancing core to vulcanize the covering thereon, means for supplying a low temperature cooling fluid under pressure to a portion of the tube subsequently encountered by the advancing core to cool the vulcanized covering before the core emerges from the tube into the atmosphere, a pair of vapor pressure devices including thermostatic bulbs positioned in the tube so that one of the bulbs is immersed in the vulcanizing fluid and the other bulb is immersed in the cooling fluid when the vulcanizing fluid and the cooling fluid are admitted to their respective portions of the tube, and means controlled by the vapor pressure devices for independently regulating the pressures of the fluids in accordance with the temperature of the fluid surrounding its respective thermostatic bulbs so as to maintain the pressure of the cooling fluid substantially equal to the pressure of the vulcanizing fluid.

4. An apparatus for vulcanizing a vulcanizable covering surrounding a continuously advancing filamentary core, which comprises an elongated tube through which such a core may pass continuously, means for supplying a high temperature, high pressure vulcanizing fluid to a portion of the tube first encountered by the core to vulcanize the covering, means provided in the vulcanizing fluid supply means for controlling the pressure of the vulcanizing fluid in said vulcanizing portion of the tube, means for supplying a low temperature cooling fluid to a portion of the tube subsequently encountered by the core to cool the vulcanized covering, means provided in the cooling fluid supply means for controlling the pressure of the cooling fluid in the said cooling portion of the tube, and means independently responsive to the temperature of the vulcanizing fluid and the temperature of the cooling fluid within the tube for regulating the pressure controlling means so as to maintain a substantially balanced pressure relationship between the vulcanizing fluid and the cooling fluid.

5. An apparatus for vulcanizing a vulcanizable covering surrounding a continuously advancing filamentary core, which comprises an elongated tube through which such a core may pass continuously, means for supplying a high temperature, high pressure vulcanizing fluid to a portion of the tube first encountered by the core to vulcanize the covering thereon, means provided in the vulcanizing fluid supplying means for controlling the pressure of the vulcanizing fluid within its respective portion of the tube, means for supplying a low temperature cooling fluid to a portion of the tube subsequently encountered by the core to cool the vulcanized covering before the core emerges into the atmosphere, means provided in the cooling fluid supply means for controlling the pressure of the cooling fluid within its respective portion of the tube, a vapor-pressure device including a thermostatic bulb designed to be immersed in the vulcanizing fluid for regulating the vulcanizing fluid pressure controlling means in response to changes in temperature of the vulcanizing fluid, and a vapor-pressure device including a thermostatic bulb designed to be immersed in the cooling fluid for regulating the cooling fluid pressure controlling means in response to changes in temperature of the cooling fluid, said thermostatic bulb being arranged to maintain the pressure of said fluids within the tube in substantial equilibrium.

6. An apparatus for vulcanizing a vulcanizable covering surrounding a continuously advancing filamentary conductor, which comprises means for subjecting the covering on the advancing conductor to a high temperature, high but fluctuating pressure vulcanizing fluid to vulcanize said coverings, said vulcanization of the covering developing internal pressures in any air and moisture entrapped therein, means for subjecting the vulcanized covering on the advancing conductor to a high pressure, low temperature cooling fluid as it emerges from said vulcanizing fluid to cool the covering and reduce any internal pressures entrapped therein to values such that there is no danger of the covering blistering as the conductor passes through the cooling fluid into the atmosphere, means connecting the adjacent ends of the vulcanizing means and cooling means, the vulcanizing fluid and the cooling fluid contacting each other with their junction point normally located at a predetermined point in the connecting means, fluctuations in the pressure of the vulcanizing fluid causing corresponding longitudinal movement of the junction point in the connecting means, means for independently regulating the pressure of each of the fluids, and means independently responsive to the temperature of the vulcanizing fluid and the temperature of the cooling fluid at points astride the normal junction point thereof for controlling said pressure regulating means so as to maintain the pressure of the cooling fluid substantially equal to the pressure of the vulcanizing fluid.

7. An apparatus for vulcanizing a vulcanizable covering surrounding a continuously advancing filamentary conductor, which comprises an elongated vulcanizing tube through which a covered conductor may be continuously advanced, means for supplying a high temperature, high but fluctuating pressure vulcanizing fluid to the vulcanizing tube to vulcanize the covering on the conductor, a cooling tube through which the conductor passes on leaving the vulcanizing tube, means for supplying a cooling fluid under pressure to the cooling tube for cooling the vulcanized covering emerging from the vulcanizing tube, a mixing tube connecting the adjacent ends of the vulcanizing tube and the cooling tube, the vulcanizing fluid and the cooling fluid contacting each other with their junction point normally located at a predetermined point in the mixing tube, a pair of temperature responsive devices including thermostatic bulbs spacedly positioned in the mixing tube so that one bulb is immersed in the vulcanizing fluid and the other bulb is immersed in the cooling fluid when the vulcanizing fluid and the cooling fluid are admitted to their respective tubes, fluctuations in the pressure of the vulcanizing fluid causing longitudinal movement of the junction point and corresponding variations in the temperature of the fluids surrounding said bulbs, means controlled by the temperature responsive device whose bulb is immersed in the vulcanizing fluid for regulating the pressure of the vulcanizing fluid in the vulcanizing tube, and means controlled by the temperature responsive device whose bulb is immersed in the cooling fluid for regulating the pressure of the cooling fluid in the cooling tube, said temperature responsive devices being designed to regulate their respective pressure controlling devices so as to maintain the pressure of the cooling fluid substantially equal to the pressure of the vulcanizing fluid.

8. An apparatus for vulcanizing a vulcanizable covering surrounding a continuously advancing filamentary core, which comprises an elongated tube through which the core is adapted to pass continuously, means for supplying high temperature, high pressure steam to a portion of the tube first encountered by the advancing core to vulcanize the covering thereon, means for supplying low temperature water to a portion of the tube subsequently encountered by the advancing core to cool the vulcanized covering before the core emerges into the atmosphere, means for independently controlling the pressures of the water and the steam in their respective portions of the tube, and temperature-sensitive means for independently controlling each pressure controlling means in accordance with the temperature of the water and the steam positioned at predetermined spaced points in the tube so as to maintain the pressures of the steam and the water substantially in equilibrium.

9. An apparatus for vulcanizing a vulcanizable covering surrounding a continuously advancing filamentary core, which comprises an elongated tube through which such a covered core may pass continuously, means for supplying high temperature, high pressure steam to a portion of the tube first encountered by the advancing core to vulcanize the covering thereon, means for supplying low temperature water to a portion of the tube subsequently encountered by the advancing core in its path of travel through the tube to cool the vulcanized covering, a pair of vapor-pressure devices including thermostatic bulbs positioned at spaced points in the tube so that one bulb is immersed in the steam and the other bulb is immersed in the water when the steam and water are admitted to their respective portions of the tube, and valves controlled by said bulbs in accordance with the temperature of the water and steam at said spaced points in the tube for maintaining the pressure of the water substantially equal to the pressure of the steam.

10. An apparatus for vulcanizing a vulcanizable covering surrounding a continuously advancing filamentary conductor, which comprises an elongated vulcanizing tube through which such a covered conductor may be advanced, means for supplying high pressure, high temperature steam to the vulcanizing tube to vulcanize the covering on the conductor, an elongated cooling tube through which the insulated conductor passes after it emerges from the vulcanizing tube, means for supplying low temperature water under pressure to the cooling tube adjacent to the entrance end thereof to cool the vulcanized covering, a mixing tube connecting the adjacent ends of the vulcanizing tube and the cooling tube, the steam and the water contacting each other with their junction point normally located at a predetermined point in the mixing tube, means for selectively regulating the pressure of the steam in the vulcanizing tube, means for selectively regulating the pressure of the water in the cooling tube, and means independently responsive to the temperatures of the steam and of the water at spaced points in the mixing tube for selectively controlling the steam pressure regulating means and the water pressure regulating means so as to maintain the water at a pressure which permits only a minimum leakage of steam from the mixing tube into the cooling tube, whereby the temperature of the water admitted to the cooling tube is maintained at its most effective operating temperature.

11. An apparatus for vulcanizing a vulcanizable covering surrounding an advancing filamentary conductor, which comprises an elongated vulcanizing tube through which a covered conductor may be advanced, means for supplying high temperature, high but variable pressure steam to the vulcanizing tube, means provided in the steam supplying means for controlling the pressure of the steam in the vulcanizing tube, an elongated cooling tube through which the insulated conductor passes after it emerges from the vulcanizing tube, a supply of low temperature water maintained at a pressure above the maximum pressure of the steam admitted to the vulcanizing tube, means for transmitting water from said supply to the cooling tube, means provided in the water transmitting means for controlling the water pressure in the cooling tube, a mixing tube connecting the adjacent ends of the vulcanizing tube and the cooling tube, the water and the steam contacting each other with their junction point normally located at a predetermined point within the mixing tube, a pair of thermostatic bulbs positioned in the mixing tube astride the normal junction point of the water and the steam, and means actuated by the thermostatic bulbs for regulating the steam pressure controlling means and the water pressure controlling means in accordance with their respective temperatures so as to maintain the pressures of the water and the steam substantially in equilibrium.

12. An apparatus for vulcanizing a vulcanizable covering surrounding a continuously advancing filamentary conductor, which comprises an elongated vulcanizing tube through which a covered conductor may be advanced, means for supplying high temperature, high but variable pressure steam to the vulcanizing tube to vulcanize the covering on the conductor, means provided in the steam supplying means for controlling the pressure of the steam in the elongated tube, an elongated cooling tube through which the covered conductor passes upon emerging from the vulcanizing tube, a supply of low temperature water maintained at a pressure above the maximum pressure of the steam admitted to the vulcanizing tube, means for transmitting water from said high pressure source to the cooling tube to cool the vulcanized covering, means provided in the water transmitting means for controlling the water pressure in the cooling tube, a mixing tube connecting the adjacent ends of the vulcanizing tube and cooling tube, the water and steam contacting each other with their junction point normally located at a predetermined position in the mixing tube, and a pair of vapor-pressure-operated devices including thermostatic bulbs positioned in the mixing tube so as to straddle the normal junction point for independently regulating the steam pressure controlling means and the water pressure controlling means in accordance with their respective temperatures so as to maintain the water pressure substantially equal to the steam pressure.

13. An apparatus for vulcanizing a vulcanizable covering surrounding an advancing filamentary conductor, which comprises an elongated vulcanizing tube through which such a covered conductor may be advanced, means for supplying high temperature, high pressure steam to the vulcanizing tube, a valve provided in the steam supplying means for controlling the pressure of the steam in the vulcanzing tube, an elongated cooling tube through which the insulated conductor passes after it emerges from the vulcanizing tube, a supply of low temperature water maintained at a pressure above the maximum pressure of the steam admitted to the vulcanizing tube, means for transmitting water from said high pressure source to the cooling tube adjacent to the entrance end thereof, a valve provided in the water transmitting means for controlling the water pressure in the cooling tube, a mixing tube connecting the adjacent ends of the vulcanizing tube and the cooling tube, the water and steam contacting each other with their junction point normally positioned at a predetermined point in the mixing tube, a vapor pressure device including a thermostatic bulb designed to be immersed in the steam adjacent to the normal junction point for actuating the valve controlling the pressure of the steam in accordance with its temperature, a second vapor pressure device including a thermostatic bulb designed to be immersed in the water adjacent to the normal junction point for actuating the valve controlling the pressure of the water in accordance with its temperature, said thermostatic bulbs being designed to regulate their respective vapor pressure devices and associated valves so as to maintain the water pressure substantially equal to the steam pressure, whereby any movement of the junction point changes the temperature of the water and steam surrounding the thermostatic bulbs and effects a corresponding regulation of the valves controlled by the bulbs so as to restore the junction point to its normal position in the mixing tube.

14. An apparatus for vulcanizing a vulcanizable covering surrounding a continuously advancing filamentary core, which comprises an elongated tube through which such a core may pass continuously, means for supplying high temperature, high but fluctuating pressure vulcanizing fluid to a portion of the tube first encountered by the advancing core to vulcanize the covering thereon, means for supplying a low temperature cooling fluid under a predetermined pressure to a portion of the tube subsequently encountered by the core to cool the vulcanized covering before the advancing core emerges from the tube into the atmosphere, means for selectively controlling the pressure of the vulcanizing fluid in its respective portion of the tube, and means for actuating the pressure controlling means in accordance with the temperature of the vulcanizing fluid at a predetermined point in its respective portion of the tube so as to maintain the pressures of the fluids substantially equal.

15. An apparatus for vulcanizing a vulcanizable covering surrounding a continuously advancing filamentary core, which comprises an elongated tube through which such a covered core may pass continuously, means for supplying high temperature, high but fluctuating pressure steam to a portion of the tube first encountered by the advancing core to vulcanize the covering as the core passes through said portion of the tube, means for supplying low temperature water under a predetermined pressure to a portion of the tube subsequently encountered by the advancing core to cool the vulcanized covering before the core emerges from the tube into the atmosphere, the steam and water contacting each other with their junction point normally positioned at a predetermined point in the tube, a vapor pressure device including a thermostatic bulb positioned in the first-mentioned portion of the tube and designed to be immersed in the steam adjacent to the normal junction point, and means controlled by the vapor pressure device for regulating the pressure of the steam in the tube in accordance with its temperature so as to maintain the pressure of the steam substantially equal to the pressure of the cooling fluid.

16. An apparatus for forming vulcanized articles, which comprises a vulcanizing tube, a cooling and sealing tube positioned in tandem with the vulcanizing tube, means for advancing an article continuously from the vulcanizing tube into and through the cooling and sealing tube, a steam supply line for introducing steam under a high and fluctuating pressure into the vulcanizing tube, a water supply line for introducing cold water under a high and fluctuating pressure to the cooling and sealing tube, a drain for withdrawing a mixture of water and steam from said tubes near the juncture thereof, a pressure control valve positioned in one of the steam supply line, the water supply line and the drain, and temperature responsive means located in one of the vulcanizing tube, the cooling and sealing tube and the drain for regulating the condition of the valve.

17. An apparatus for forming vulcanized articles, which comprises a vulcanizing tube, a cooling and sealing tube positioned in tandem with the vulcanizing tube, means for advancing an article continuously from the vulcanizing tube into and through the cooling and sealing tube, a steam supply line for introducing steam under a high and fluctuating pressure into the vulcanizing tube, a water supply line for introducing cold water under a high and fluctuating pressure to the cooling and sealing tube, a pressure control valve positioned in the steam supply line, means responsive to the temperature of the steam at a predetermined point near the exit end of the vulcanizing tube for throttling the steam control valve and reducing the pressure of the steam when steam enters the cooling and sealing tube, a pressure control valve positioned in the water supply line, and means responsive to temperature of the water at a predetermined point near the entrance end of the cooling and sealing tube for throttling the valve in the water supply line and reducing the water pressure when water enters the exit end of the vulcanizing tube, whereby the temperature-sensitive means coact to regulate the pressures of the steam and water so as to maintain the steam and water in their respective tubes.

18. An apparatus for forming vulcanized articles, which comprises a vulcanizing tube, a cooling and sealing tube positioned in tandem with the vulcanizing tube, means for advancing an article continuously from the vulcanizing tube into and through the cooling and sealing tube, a steam supply line for introducing steam under a high and fluctuating pressure into the vulcanizing tube, a water supply line for introducing cold water under a high and fluctuating pressure to the cooling and sealing tube, the steam and water contacting each other with their junction point normally positioned at a predetermined point near the adjacent ends of the vulcanizing tube and the cooling and sealing tube, a drain for withdrawing a mixture of water and steam from the junction point, a valve positioned in the water supply line for selectively controlling the pressure of the water in the cooling tube, a valve provided in the steam supply line for controlling the pressure of the steam in the vulcanizing tube, a valve provided in the drain for controlling the rate of discharge of the fluids from the junction point, and means independently responsive to the temperatures of the cooling water, the steam and the mixture of water and steam at predetermined spaced points with respect to the normal junction point of the steam and the water for actuating the valves so as to maintain the pressure of the water substantially equal to the pressure of the steam.

19. An apparatus for vulcanizing a vulcanizable covering surrounding a continuously advancing filamentary core, which comprises an elongated tube through which such a core may pass continuously, means for suppling a high temperature, high pressure vulcanizing fluid to a portion of the tube first encountered by the advancing core to vulcanize the covering thereon, means for supplying a low temperature cooling fluid to a portion of the tube subsequently encountered by the advancing core to cool the vulcanized covering before the core emerges from the tube into the atmosphere, said vulcanizing fluid and cooling fluid contacting each other with their junction point normally positioned at a predetermined point within the elongated tube, means for independently regulating the pressure of each fluid within its respective portion of the tube in accordance with its respective temperature so as to maintain the pressures of the fluids within the tube substantially in equilibrium, means for discharging the mixed fluids forming at the junction point from the tube, a valve provided in the discharge means for regulating the rate of discharge of the mixed fluids from the junction point, a vapor pressure device including a thermostatic bulb positioned in the mixed fluid discharge means at a point adjacent to the junction point for regulating the said valve so as to control the discharge of the mixed fluids in accordance with their temperature and thereby maintain the discharge of the mixed fluids at a rate corresponding to the pressure of the vulcanizing fluid.

20. An apparatus for vulcanizing a vulcanizable covering surrounding a continuously advancing filamentary core, which comprises an elongated tube through which such a core may pass continuously, means for supplying a high temperature, high pressure vulcanizing fluid to a portion of the tube first encountered by the core to vulcanize the covering thereon, means provided in the vulcanizing fluid supplying means for controlling the pressure of the vulcanizing fluid within its respective portion of the tube, means for supplying a low temperature cooling fluid to a portion of the tube subsequently encountered by the core to cool the vulcanized covering before the core emerges from the tube into the atmosphere, means provided in the cooling fluid supply means for controlling the pressure of the cooling fluid within its respective portion of the tube, said vulcanizing fluid and cooling fluid contacting each other with their junction point normally positioned at a predetermined point within the tube, means for discharging the mixed fluids forming at the junction point from the tube, means for controlling the rate of discharge of the mixed fluids from the junction point, a vapor pressure device including a thermostatic bulb positioned in the vulcanizing portion of the tube adjacent to the junction point for regulating the vulcanizing fluid pressure controlling means in accordance with the temperature within the vulcanizing fluid, a thermostatic bulb positioned in the cooling portion of the tube adjacent to the junction point for regulating the cooling fluid pressure controlling means in accordance with the temperature of the cooling fluid, and a thermostatic bulb positioned in the mixed fluid discharging means for controlling the discharge control means in accordance with the temperature of the mixed fluids, said thermostatic bulbs being arranged to simultaneously regulate the pressure of their respective fluids and the rate of discharge of the mixed fluids from the junction point so as to maintain the pressures of the fluids within the tube in substantial equilibrium.

21. An apparatus for vulcanizing a vulcanizable covering surrounding a continuously advancing filamentary core, which comprises an elongated tube through which the core passes continuously, means for supplying high temperature, high pressure steam to the portion of the tube first encountered by the core to vulcanize the covering thereon, means for supplying low temperature water to a portion of the tube subsequently encountered by the advancing core to cool the vulcanized covering before the core emerges into the atmosphere, said water and steam having their junction point at a given point in the elongated tube, means for independently controlling the pressures of the water and the steam in accordance with their respective temperatures so as to maintain the pressure of the water and the steam substantially in equilibrium, means for discharging the mixed fluids forming at the junction point from the tube, and means for regulating the rate of discharge of the condensate from the junction point in accordance with the temperature of the mixed fluids so as to maintain the discharge of the mixed fluids at a rate corresponding to the pressures of the steam and the water.

22. An apparatus for vulcanizing a vulcanizable covering surrounding an advancing conductor, which comprises an elongated vulcanizing tube through which a covered conductor may be advanced, means for supplying high temperature, high pressure steam to the vulcanizing tube to vulcanize the covering, means for selectively controlling the pressure of the steam in the vulcanizing tube, an elongated cooling tube through which covered conductor passes upon emerging from the vulcanizing tube, a supply of low temperature water maintained at a pressure above the maximum pressure of the steam admitted to the vulcanizing tube, means for transmitting the water from said high pressure source to the cooling tube to cool the vulcanized covering on the conductor advancing therethrough, means provided in the water transmitting means for controlling the pressure of the water in the cooling tube, a mixing tube connecting the adjacent ends of the vulcanizing tube and cooling tube within which the junction point of the water and steam normally is located, means for discharging the resulting mixture of steam and water forming at the junction point from the mixing tube, means for regulating the rate of discharge of the mixed fluids from the mixing tube, and a trio of vapor pressure-operated devices including thermostatic bulbs positioned adjacent to the junction point of the water and the steam for regulating the steam pressure controlling means, the water pressure controlling means and the condensate discharge controlling means so as to maintain the water pressure substantially equal to the steam pressure.

23. The process for the vulcanization of a vulcanizable covering surrounding a continuously advancing core, which comprises passing such a core through an elongated treating zone, subjecting the advancing core to a high pressure, high temperature vulcanizing fluid within the portion of the treating zone first encountered by the advancing core to vulcanize the covering thereon, subjecting the advancing core to a high pressure, low temperature cooling fluid within the next succeeding portion of the treating zone to cool the vulcanized covering, continuously measuring the temperature of the vulcanizing fluid at a predetermined point in the vulcanizing portion of the treating zone, continuously measuring the temperature of the cooling fluid at a predetermined point in the cooling portion of the treating zone, and independently controlling the pressures of the fluids in their respective portions of the treating zone in accordance with the measured temperatures so as to maintain the pressures of the vulcanizing fluid and the cooling fluid substantially in equilibrium.

24. The process for the continuous vulcanization of a vulcanizable covering surrounding a continuously advancing electrical conductor, which comprises passing such a covered conductor through a vulcanizing zone, maintaining high temperature, high pressure steam in the vulcanizing zone to vulcanize the covering surrounding the conductor, passing the conductor and the vulcanized covering continuously and directly from said vulcanizing zone through a cooling zone, maintaining low temperature water under pressure in the cooling zone to cool the vulcanized covering as the conductor passes therethrough, causing the junction point of the steam and water to occur normally at a predetermined point within a mixing zone communicating with the adjacent ends of the vulcanizing zone and the cooling zone, continuously measuring the temperature of the steam and the temperature of the water at points equally spaced astride the normal junction point, and independently regulating the pressures of the steam in the vulcanizing zone and the cooling water in the cooling zone in accordance with their respective measured temperature so as to maintain the pressure of the cooling water in the cooling zone substantially equal to the pressure of the steam in the vulcanizing zone at all times.

25. The process for the continuous vulcanization of a vulcanizable covering surrounding a continuously advancing electrical conductor, which comprises passing such a covered conductor through a vulcanizing zone, maintaining a high temperature, high pressure vulcanizing fluid within the vulcanizing zone to vulcanize the covering on the advancing conductor, passing the conductor and the vulcanized covering continuously and directly from said vulcanizing zone through a cooling zone, continuously maintaining a low temperature cooling fluid under pressure in a cooling zone to cool the vulcanized covering as the conductor advances therethrough, causing the junction point of the vulcanizing fluid and the cooling fluid to occur normally at a predetermined point within a mixing zone communicating with the adjacent ends of the vulcanizing zone and the cooling zone, continuously discharging the mixed fluids forming at the junction point from the mixing zone, continuously measuring the temperature of the vulcanizing fluid, the cooling fluid and the mixed fluid forming at the junction point at points equally spaced about the normal junction point of the fluids in the mixing zone, and independently regulating the discharge of the mixed fluids from the mixing zone, the pressure of the cooling fluid and the pressure of the vulcanizing fluid in accordance with their respective measured temperatures so as to maintain the pressure of the cooling fluid substantially equal to the pressure of the vulcanizing fluid.

26. The process for the vulcanization of a vulcanizable covering surrounding a continuously advancing electrical core, which comprises continuously passing such a core through an elongated treating zone, supplying high temperature, high pressure steam to a portion of the treating zone first encountered by the core as it travels therethrough to vulcanize the covering on the core, supplying low temperature water to a portion of the treating zone subsequently encountered by the advancing core for cooling the vulcanized covering, said steam and water having their junction point normally positioned at a predetermined point in the treating zone, independently controlling the pressure of the water and steam in their respective portions of the treating zone in accordance with their respective temperatures so as to maintain the pressures of the water and the steam substantially in equilibrium, discharging the mixed fluids forming at the junction point of the water and steam from that portion of the treating zone, and controlling the rate of discharge of the mixed fluids from the junction point in accordance with the temperature of the mixed fluids.

27. The process for the vulcanization of a vulcanizable covering surrounding a continuously advancing electrical core, which comprises continuously passing such a covered core through a treating zone, continuously supplying high temperature, high pressure steam to a portion of the treating zone first encountered by the core as it travels therethrough to vulcanize the covering thereon, continuously supplying low temperature water to a portion of the treating zone subsequently encountered by the advancing core for cooling the vulcanized covering, causing the junction point of the steam and the water to occur normally at a given point in the treating zone, continuously removing the mixed fluids forming at the junction point from that portion of the treating zone, and independently regulating the pressure of the water, the pressure of the steam and the rate of discharge of the mixed fluids from the junction point in accordance with their respective temperatures existing at points spacedly positioned with respect to the normal junction point so as to maintain the cooling water at a pressure substantially equal to the pressure of the steam.

28. An apparatus for the continuous vulcanization of a vulcanizable covering surrounding conductors, which comprises an elongated vulcanizing tube through which such a covered conductor may be advanced, a supply of high temperature steam having a maximum pressure of 250 pounds per square inch and subject to substantial variations in pressure, means for supplying the steam to the vulcanizing tube to vulcanize the covering on the conductor, means for selectively controlling the pressure of the steam in the vulcanizing tube, an elongated cooling tube through which the insulated conductor passes after it emerges from the vulcanizing tube, a supply of low temperature water maintained at a pressure of about 270 pounds per square inch, means for continuously transmitting water from said high pressure supply to the cooling tube to cool the vulcanized covering, said steam and water contacting each other with their junction point normally positioned at a predetermined point with respect to the exit end of the vulcanizing tube, means provided in the water transmitting means for selectively controlling the pressure of the water introduced into the cooling tube, a temperature-sensitive element subject to the temperature of the steam adjacent to the normal junction point, a second temperature-sensitive element subject to the temperature of the water adjacent to the normal junction point, fluctuations in the pressure of the steam causing longitudinal movement of the junction point with respect to the temperature-sensitive elements and corresponding changes in the temperature of the water and steam surrounding said temperature-sensitive elements, and means actuated by the temperature-sensitive elements for regulating the water pressure controlling means and the steam controlling means so as to maintain the pressures of the water and the steam substantially equal.

29. An apparatus for vulcanizing a vulcanizable covering surrounding an advancing conductor, which comprises an elongated vulcanizing tube through which such a covered conductor may be advanced, a supply of high pressure steam having a maximum temperature of 250 pounds per square inch and subject to substantial variations in pressure, means for supplying the steam to the vulcanizing tube to vulcanize the covering, means for selectively controlling the pressure of the steam in the vulcanizing tube, an elongated cooling tube through which a covered conductor passes upon emerging from the vulcanizing tube, a supply of low temperature water maintained at a pressure of about 270 pounds per square inch, means for transmitting the water from said high pressure source to the cooling tube to cool the vulcanized covering on the conductor advancing therethrough, means provided in the water transmitting means for selectively controlling the pressure of the water in the cooling tube, a mixing tube connecting the adjacent ends of the vulcanizing tube and cooling tube, the water and steam contacting each other with their junction point normally positioned at a predetermined point in the mixing tube, means for discharging the mixture of steam and water from the mixing tube, means for regulating the rate of discharge of the mixed fluids from the mixing tube, and a trio of vapor pressure-operated devices including thermostatic bulbs positioned about the normal junction point so that one bulb is immersed in the steam, another bulb is immersed in the water and the remaining bulb is immersed in the mixture of steam and water discharged from the mixing tube when the steam and the water are admitted to their respective tubes for regulating the steam pressure controlling means, the water pressure controlling means and the discharge controlling means in accordance with the temperature at their associated bulbs so as to maintain the water pressure substantially equal to the steam pressure.

GEORGE E. BERGGREN.

REFERENCES CITED

The following references are of record in the file of this patent:

UNITED STATES PATENTS

| Number | Name | Date |
| --- | --- | --- |
| 2,069,087 | Forstrom et al. | Jan. 26, 1937 |
| 2,426,341 | Canfield | Aug. 26, 1947 |

FOREIGN PATENTS

| Number | Country | Date |
| --- | --- | --- |
| 864,121 | France | Jan. 8, 1941 |